3,264,312
PROCESS FOR MAKING ISOMERIC FORMS OF 5-(α-HYDROXY-α-2-PYRIDYLBENZYL)-7-(α - 2 - PYRIDYLBENZYL) - 5 - NORBORNENE-2,3-DICARBOXIMIDE
Lawrence G. Stevenson, Merriam, and Frank P. Welkner, Jr., Shawnee, Kans., assignors to Gulf Oil Corporation, Pittsburgh, Pa., a corporation of Pennsylvania
No Drawing. Filed Mar. 24, 1965, Ser. No. 442,471
2 Claims. (Cl. 260—295)

This invention relates to an improved procedure for manufacture of a substituted 5-norbornene-2,3-dicarboximide which possesses utility as a pesticide. More specifically, an improvement has been made in a procedure for manufacturing 5 - (α-hydroxy-α-2-pyridylbenzyl)-7-(α-2-pyridylbenzylidene)-5-norbornene-2,3-dicarboximide, said improvement consisting of a simple, inexpensive purification procedure.

In Science, vol. 144, pages 412–413 of April 24, 1964, there is disclosed the synthesis of the aforementioned compound by means of the following steps:

(a) Reaction of two moles of 2-benzoylpyridine with cyclopentadiene in the presence of an essentially anhydrous solution of sodium ethoxide in ethanol to yield a mixture containing a fulvene addition product.

(b) Reaction of the product of step (a) with maleimide by heating in benzene solution to yield a product mixture containing two endo and two exo stereoisomers.

(c) Filtration of the product mixture of (b) to yield a solid product melting at 190° to 198° C.

The use of sodium ethoxide as the condensing agent in the first step of the synthesis on a commercial scale normally yields a reaction product which is dark brown in color and obviously impure, resulting in the carrying over of impurities into the succeeding step. It has been discovered that sodium hydroxide may be used instead of sodium ethoxide to produce a benzoylpyridine-cyclopentadiene addition product of good purity and light orange color. Following the use of the improved product of step (a) in the reaction with maleimide in step (b), we have found that by use of a novel purification procedure there is obtained a substantially colorless and odorless product containing only traces of the reaction solvent.

Briefly, in a process comprising the following steps:
(a) Reacting 2-benzoylpyridine with cyclopentadiene under an inert atmosphere in the presence of a solution of sodium or potassium hydroxide in a lower alkanol to yield a product of reaction of two moles of 2-benzoylpyridine per mol of cyclopentadiene, consisting essentially of 2-(α-hydroxy-α-2-pyridylbenzyl)-6-phenyl-6-(2-pyridyl) fulvene, and (b) Reacting maleimide with the reaction product of step (a) in an inert liquid reaction medium under an inert atmosphere to yield a solid product consisting essentially of isomeric forms of 5-(α-hydroxy-α-2-pyridylbenzyl) - 7 - (α-2-pyridylbenzylidene)-5-norbornene-2,3-dicarboximide;

our improvement consists in (c) Forming an aqueous slurry of the solid product of step (b), removing impurities from the aqueous slurry by steam distillation and mechanically reducing the diameter of crystalline aggregates of solid product in the aqueous slurry and subsequently, (d) Recovering and drying the solid product from the aqueous slurry of step (c) under subatmospheric pressure to yield a finely divided solid product which is substantially free of the inert liquid reaction medium employed in step (b).

The process is described in more detail in the discussion which follows. Parts given in the procedures are parts by weight unless specified otherwise.

(a) *Reacting 2-benzoylpyridine with cyclopentadiene.*—Completely anhydrous conditions are not readily obtainable in this step, since water is a reaction product. It has been found feasible to use sodium or potassium hydroxide dissolved in a lower alkanol, preferably ethanol, to promote the reaction. Preferably the molar ratio of 2-benzoylpyridine to cyclopentadiene is at least 1.5 and less than 2.0, rather than 2.0 or above, because some loss of cyclopentadiene through competing side reactions normally occurs. It is desirable that all of the 2-benzoylpyridine charged to the reactor be consumed by the intended reaction. This can be assured by use of an excess of cyclopentadiene. However, a large excess of cyclopentadiene is detrimental. A typical procedure is presented below.

Into a stirred reactor equipped with a vapor outlet, reflux condenser and a heat exchange means are charged 852 parts by weight of ethanol and 11.4 parts of sodium hydroxide pellets. The pellets are dissolved, with stirring, following which the temperature is lowered to 5° C. and the reactor is purged with nitrogen gas, a steady flow of nitrogen through the reactor being maintained during the remainder of the procedure.

With the aid of a steam heating coil, 300 parts by weight of 2-benzoylpyridine is melted and added slowly to the reactor, with stirring, after which the temperature is lowered to about 5° C. by passing refrigerant through a cooling jacket. The flow of refrigerant is maintained to control the temperature within the range of about 15° to 25° C. during the addition of about 62 to 66 parts by weight of cyclopentadiene (preferably freshly prepared by decomposition of the dimer). After the exothermic reaction has subsided, cooling is discontinued and the reaction mixture is then maintained at 15° to 25° C., with stirring, for about 15 hours, then is cooled to 0° to 5° C. The solid product is separated by filtration. The filter cake is then slurried in about 680 parts of ethyl acetate, heated to 65° to 70° C., with stirring, then cooled to 5° to 10° C. and the solid product is again recovered by filtration. The product is light orange in color and consists essentially of 2-(α-hydroxy-α-2-pyridylbenzyl)-6-phenyl-6-(2-pyridyl) fulvene, which is the product of reaction of two mols of 2-benzoylpyridine with each mol of cyclopentadiene.

(b) *Reacting maleimide with the product of step (a).*—In this step the reagents are at most, only partially soluble in the inert reaction solvent. The substituted fulvene reaction product of step (a) is suspended in the solvent and the final product remains suspended and apparently insoluble after formation. However, the change in size of crystals and crystalline aggregates in a slurry of the final product over an extended period of time may be an indication of the occurrence of limited solubility. In the selection of an inert solvent, xylene is preferable to benzene, particularly from the standpoint of hazards created by escape of solvent vapor into the atmosphere during purification of the product and recovery of solvent for re-use.

As often occurs in heterogeneous reactions in an inert solvent, some solvent becomes entrapped in or adsorbed on the final product, so that it is difficult or impossible to remove. Extracting with a more volatile wash solvent after recovery of the solid product by filtration will alleviate this problem, in part.

Following is an illustrative procedure which may be used in this step.

Nitrogen gas is admitted to a stirred reactor vessel and continued throughout the following procedure:

Approximately 1090 parts by weight of xylene is charged to the reactor, stirring is begun, and then 70.5 parts of maleimide is added. To the resulting mixture is then added 274 parts of the product obtained in step (a).

The reactor is heated to 80° C. and reaction is continued at this temperature for approximately 12 hours. Heating is then discontinued and the temeparture is allowed to fall to 30° to 35° C. while stirring is continued. By use of refrigeration, the reaction mixture is then cooled to 0° to 5° C. and the suspended solid reaction product is separated by filtration. The solid is washed on the filter with about 50 parts of hexane. The filter cake is then slurried in 1000 parts of hexane in a stirred vessel, and is agitated at about 65° to 70° C. for three hours, after which the mixture is cooled to below 20° C. and the solid product is again separated by filtration. The hexane solvent is then removed from the filter cake by treating in a vacuum dryer at 60° C. for 12 hours. The dry solid product consists essentially of isomeric forms of 5 - (α - hydroxy - α - 2 - pyridylbenzyl) - 7 - (α - 2-pyridylbenzylidene) - 5 - norbornene - 2,3 - dicarbox-imide. Odor indicates the presence of a small amount of impurity, principally xylene. The complete elimination of reaction solvent from the solid product is extremely difficult.

The solid reaction product is, in fact, a very complex and unusual mixture of substances. The name given above corresponds to the structural formula below:

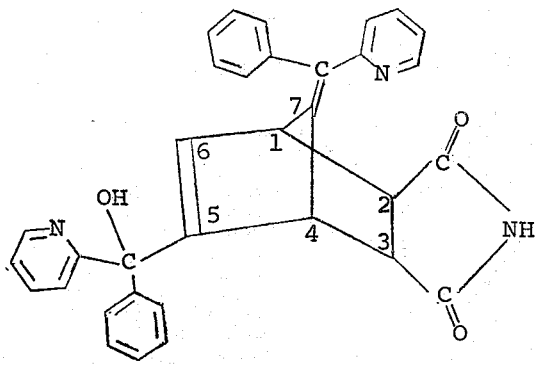

The structural formula may also be written as follows:

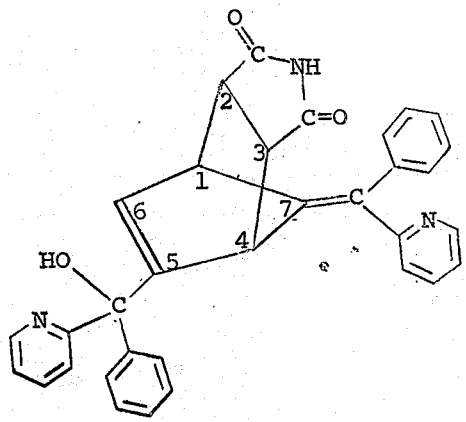

It can readily be seen that these structural formulas represent two stereoisomeric substances, not a single compound. Furthermore the substituent group attached to position 7 is not free to rotate and may occupy either of two positions, Obviously, then, each of the above structural formulas represents two possible stereoisomers, which brings the total to four.

Besides the four stereoisomers, it will be noticed that the substituent group attached at the 5-position has an asymmetric carbon atom, so that each stereoisomer may also exist as dextro and laevo optical isomers. If we also consider variations possible in relative positions of the bonds at the 1 and 4 position, it is reasonable to expect to find sixteen or more isomeric substances in the product. If one also considers the very reasonable probability of the existence of polymorphic forms of some of the isomeric substances in the mixture, the complexity of the product is almost beyond description. In such a complex mixture, sharp melting points are not to be expected. The product has a melting range of several degrees, which may vary somewhat with changes in the manufacturing process and cannot be used as a definite indication of the degree of purity, although it is a characteristic property of a particular product.

Analyses indicate that the complex product as made both by the above procedure and that reported in Science, vol. 144, pp. 412–413, contains substantial amounts of reaction solvent and other impurities. It can be predicted with some confidence that eventually individual rats with highly developed senses of taste and smell will reject baits containing this product. Judging from past experience with pesticides, this will result inevitably in the development of a strain of rats which are more difficult to poison with this substance. By reducing the probability of this occurrence in the early history of the use of the product, the useful life of this raticide can be greatly prolonged. Purification of the composition, however, is rendered difficult by the presence of the imide structure which is easily decomposed. We have now discovered a simple procedure by means of which the product of step (b) can be converted into a material which is substantially free of reaction solvent. Although some of the physical properties of the purified material are slightly different (melting range is lower), the resulting product appears to be equally toxic to rats and is much less likely to be detected when incorporated in baits. The following is an illustrative purification procedure.

(c) *Purification of the product of step (b)*.—The primary objective of the purification procedure is the elimination of any odor or taste which would serve to warn rats of the presence of the product in toxic bait formulations.

It is also desirable to obtain the product in sufficiently finely divided form that it will pass through a 30 mesh sieve or finer (U.S. Standard Series) so as to facilitate uniform mixing with other ingredients of toxic bait formulations. A product which appears to be sufficiently pure for all practical purposes and is in a readily usable, finely divided form may be obtained by means of the simple procedure described below:

The solid product of step (b) is slurried in water in a closed vessel equipped with steam inlet, distillation column with condenser and a centrifugal circulating pump. Steam distillation is carried on for about 20 minutes. After the contents of the steam distillation vessel are cooled to about 30 to 35° C. and while being cooled to near ambient temperature, the product mixture is circulated through the centrifugal pump. Circulation is continued for a length of time sufficient to produce a slurry containing crystalline aggregates of solid product which are less than 30 mesh screen size (U.S. Standard Series). The purified solid product is then recovered by filtration followed by drying in a vacuum dryer at about 75° to 100° C. and about 30 mm. (abs.) pressure for about 24 to 36 hours. The product is a free-flowing powder of creamy to tan color, which melts at about 175° to 180° C. Test results on a large number of rats indicate that this product, although it has a faint odor (which is noticed by humans) possesses no odor or taste which is objectionable to either wild species or white laboratory rats.

The procedure described above appears to consist of a fortuitous combination of features. While steam is being introduced into the slurry there is a great deal of agitation of the mixture, with the production of considerable noise and vibration. Several effects are observed at this time. Growth of crystalline aggregates is quite apparent. During this change, two effects occur; impurities are removed from the vessel by steam distillation and large aggregates form. The reduction of aggregate size by circulation through the pump after distillation appears to effect a partial removal of occluded solvent by washing and causes a more easily dried filter cake to be produced. Drying under reduced pressure over a period of several hours appears to effectively complete the removal of solvent, whereas drying for a period of minutes rather than hours under sharply reduced pressure does not. This suggests that diffusion or other slow process is important in this operation. In an effort to learn if traces of solvent could be removed from the solid product of step (b) by vacuum drying alone, some of the product was micropulverized and dried under reduced pressure for a prolonged period without success. The combination of steaming followed by mechanical reduction of particle size in the slurry appears to be necessary to the effectiveness of the drying step.

Because of the lack of chemical stability of the imide structure in the product, both steaming and prolonged drying at a temperature between about 75° and 100° C. would appear to involve a risk of decomposition. However, although the melting range appears to indicate some change may have occurred in the nature of the product, effectiveness as a raticide is apparently not impaired.

The combination of steam distillation of an aqueous slurry followed by mechanical reduction of the size of suspended aggregates in the slurry and subsequent filtration and slow vacuum drying effects a very great reduction in odor of the product, at least so far as the human sense of smell is concerned. The odor of the product is so faint, in fact, that members of an odor panel have been found to disagree as to how to describe the odor and a majority were unable to discern any odor resembling that of the organic solvent used in the process. In tests with wild rats in captivity, there was no substantial evidence of a tendency to either reject or to prefer food containing the product. Whether wild rats exhibit a preference if not held captive has not been definitely established. However, a substantial quantity of product purified by the method described above has been put to practical use without observation of any signs of preference on the part of unconfined wild rats.

What is claimed is:
1. In a process for manufacturing 5-($\alpha$-hydroxy-$\alpha$-2-pyridylbenzyl) - 7 - ($\alpha$ - 2 - pyridylbenzylidene) - 5 - norbornene-2,3-dicarboximide comprising the steps:
  (a) reacting 2-benzoylpyridine with cyclopentadiene under an inert atmosphere in the presence of a solution of an alkali metal hydroxide selected from the group consisting of sodium hydroxide and potassium hydroxide in a lower alkanol to yield a product of reaction of two mols of 2-benzoylpyridine per mol of cyclopentadiene consisting essentially of 2-($\alpha$-hydroxy-2-pyridylbenzyl) - 6-phenyl-6-(2 - pyridyl) fulvene, and
  (b) reacting maleimide with the product of step (a) in an inert liquid reaction medium under an inert atmosphere to yield a solid product consisting essentially of isomeric forms of 5-($\alpha$-hydroxy-$\alpha$-2-pyridylbenzylidene) - 7 - ($\alpha$ - 2 - pyridylbenzylidene) - 5-norbornene-2,3-dicarboximide, the improvement consisting of
  (c) forming an aqueous slurry of the solid product of step (b), removing impurities from the aqueous slurry by steam distillation and mechanically reducing the size of crystalline aggregates of solid product in the aqueous slurry, and
  (d) recovering the solid product from the aqueous slurry of step (c) and drying the recovered material under subatmospheric pressure until substantially free of the inert liquid reaction medium employed in step (b).

2. In a process for manufacturing substantially pure ordorless 5-($\alpha$-hydroxy-$\alpha$-2-pyridylbenzyl)-7-($\alpha$-2-pyridylbenzyl)-5-norbornene-2,3-dicarboximide comprising the steps:
  (a) reacting 2-benzoylpyridine with cyclopentadiene in a molar ratio of between 1.5 and 2.0 mols of 2-benzoylpyridine per mol of cyclopentadiene under an inert atmosphere in the presence of a solution of sodium hydroxide in ethanol to yield a product of reaction of two mols of 2-benzoylpyridine per mol of cyclopentadiene consisting essentially of 2-($\alpha$-hydroxy-$\alpha$-2-pyridylbenzyl)-6-phenyl-6-(2-pyridyl) fulvene, and
  (b) reacting maleimide with the product of step (a) in an inert liquid reaction medium under an inert atmosphere to yield a solid product consisting essentially of isomeric forms of 5-($\alpha$-hydroxy-$\alpha$-2-pyridylbenzyl) - 7 - ($\alpha$ - 2 - pyridylbenzylidene) - 5 - norbornene-2,3-dicarboximide, the improvement consisting of
  (c) forming an aqueous slurry of the solid product of step (b), removing impurities from the aqueous slurry by steam distillation, mechanically reducing the size of crystalline aggregates of solid product in the aqueous slurry by circulating the slurry through a pump, and
  (d) recovering the solid product from the aqueous slurry of step (c) and drying the recovered material at a temperature within the range of about 75° to 100° C. under subatmospheric pressure until substantially free of the inert liquid reaction medium employed in step (b).

References Cited by the Examiner

Poos et al.: Journal of Medicinal and Pharmaceutical Chemistry, volume 5 (1962), pages 883–96.

Roszkowski et al.: Science, vol. 144, No. 3617, pp. 412–413.

WALTER A. MODANCE, *Primary Examiner.*

A. L. ROTMAN, *Assistant Examiner.*